United States Patent

[11] 3,562,642

[72] Inventor Richard Hochschild
2915 Pebble Drive, Corona Del Mar, Calif. 92625
[21] Appl. No. 781,704
[22] Filed Dec. 2, 1968
[45] Patented Feb. 9, 1971
Continuation of application Ser. No. 390,616, Aug. 19, 1964, which is a continuation-in-part of application Ser. No. 373,283, June 8, 1964.

[54] APPARATUS AND METHOD FOR MEASURING PROPERTIES OF MATERIALS BY SENSING SIGNALS RESPONSIVE TO BOTH AMPLITUDE AND PHASE CHANGES IN TRANSMITTED OR REFLECTED MICROWAVE ENERGY
14 Claims, 8 Drawing Figs.

[52] U.S. Cl. .................................................. 324/58.5
[51] Int. Cl. ...................................................... G01r 27/04
[50] Field of Search ........................................... 324/58.5
(A), 58.5 (B); 343/5

[56] References Cited
UNITED STATES PATENTS
3,060,421 10/1962 Rideout ........................ 343/5
3,155,898 11/1964 Chope ........................... 324/58.5

OTHER REFERENCES
IMPROVEMENTS IN MICROWAVE SWEPT FREQUENCY TECHNIQUES - in Hewlett-Packard Application Note No. 54, Nov. 1961, Hewlett-Packard Company, pp. 1— 6 (copy in group 258 class 324 subclass 58).

*Primary Examiner*—Edward E. Kubasiewicz
*Attorney*—Richard Hochschild

ABSTRACT: This invention relates to an apparatus and method utilizing microwaves for testing objects, especially nonmetalic objects, nondestructively for numerous characteristics such as thickness, chemical and physical properties, flaws, moisture content, vibration and displacement. Discrimination between these variables, or the suppression of one or more of these variables which are not of interest to the measurement, are shown to be possible utilizing detection apparatus which provides and displays two output signals, each of which is an independent function of the amplitude and phase of the microwave signal received from the test object. For example, different variables cause deflections in different directions in an XY display of the two independent output signals. Alternatively, means are described for obtaining a single output signal responsive to only one variable in the test object, or a single output signal in which the response to one test variable is suppressed.

INVENTOR.
RICHARD HOCHSCHILD
BY
ATTORNEYS

INVENTOR.
RICHARD HOCHSCHILD

4
APPARATUS AND METHOD FOR MEASURING PROPERTIES OF MATERIALS BY SENSING SIGNALS RESPONSIVE TO BOTH AMPLITUDE AND PHASE CHANGES IN TRANSMITTED OR REFLECTED MICROWAVE ENERGY

This application is a continuation of applications Ser. No. 390,616, filed Aug. 19, 1964, which is a continuation-in-part of SN. 373,283 filed Jun. 6, 1964.

This invention relates to an apparatus and method for testing and sensing numerous characteristics relative to test objects, in a nondestructive manner, by use of microwave energy. The invention is particularly adapted for determining characteristics relative to nonmetallic substances such as rubber, plastics, ceramics, foodstuffs, paper, testiles, concrete, glass, liquid and solid chemicals, petroleum and petroleum products, and many others. Among the uses to which the present invention may be applied are the determination of physical and chemical properties, thickness gauging, flaw detection, moisture content determination, and motion, vibration and displacement measurements.

Insofar as is known to applicant, prior-art workers in the field of nondestructive microwave testing of materials generate only a single output voltage, which output voltage is not selected in any predetermined manner relative to the phase thereof. Accordingly, such single output voltage will not produce accurate results, relative to a particular quality to be tested, if there is more than one variable. For example, if all test parts in a particular test situation are characterized by precisely the same chemical composition, physical properties, and position relative to the sensing element, microwave transmission (or reflection or scattering) will be a function of part thickness only, which thickness can then be accurately measured. However, if only a single other parameter (for example, composition) varies, a unique measurement of thickness is no longer possible by prior-art microwave testing techniques known to applicant. This is because both thickness and composition affect microwave transmission. Of course, the same applies relative to other variables, for example dielectric constant, etc.

In most situations, more than a single variable is present relative to the products resulting from numerous types of manufacturing operations. For example, in the field of paper manufacture it very often occurs that moisture content will vary together with thickness. If, for example, thickness is the only determination which it is desired to make, it will be understood that such variation in moisture content will prevent accurate thickness measurement.

In view of the above and other factors relative to the field of nondestructive testing and sensing by means of microwaves, it is one primary object of the present invention to provide a simple and effective apparatus and method for effecting nondestructive microwave testing in such manner that an undesired variable is suppressed, and therefore has substantially no effect upon the output produced relative to the desired variable.

There are many situations, relative to mass production of various products, wherein the product is not satisfactory unless several variables are within desired ranges. Again referring to the field of paper manufacture, as one of many possible illustrations, it may occur that the paper will be satisfactory only if moisture content is within a desired range, and thickness is within a desired range. It will be apparent that it is highly desirable to provide a single apparatus and method for sensing and displaying both of such variables simultaneously, so that an operator (or electronic or mechanical device) may quickly and easily reject defective parts.

Let it be assumed, for example, that it is desired to sort a very large quantity of manufactured parts according to two characteristics, such as thickness and moisture content. By making a series of initial experimental determinations, it may be determined that all parts which have the desired thickness and moisture content will fall within a certain zone on a two-dimensional display, which zone may have any regular or irregular shape. Regardless of the shape of the zone, it may be sketched on the paper of an XY recorder, for example, or drawn on the screen of an oscilloscope. The boundary between good and bad parts being thus indicated on the display means (XY recorder, oscilloscope or other two-dimensional means), an untrained operator may readily sort the parts in a very rapid manner by observing whether the response is within or without the "acceptable" zone. Such a procedure would not be possible, by means of conventional one-dimensional presentations, if (as is normally the case) there is more than one significant test variable.

In view of the above, it is another important object of the present invention to provide an improved method and apparatus for effecting, by means of microwaves, a two-dimensional display of information relative to various parts to be tested, and/or for determining two variables simultaneously.

These and other objects will become apparent from the following detailed description taken in connection with the accompanying drawings in which.

Figure 1:
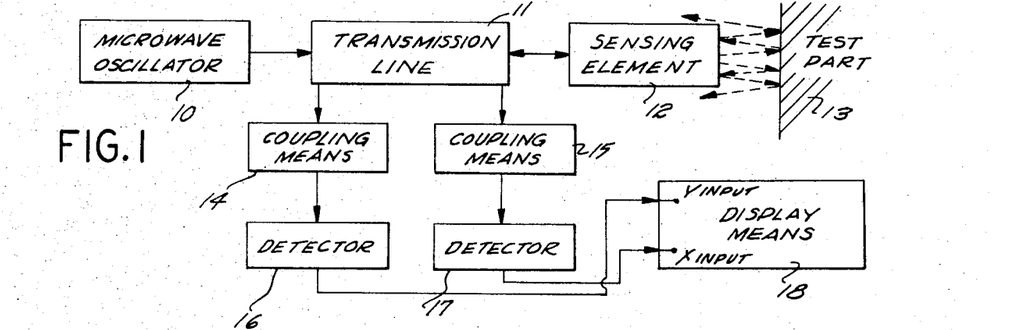
FIG. 1 is a block diagram schematically indicating one embodiment of the apparatus of the present invention.

Referring first to the apparatus illustrated schematically in FIG. 1, the general relationship between components may be the same as was described in the above-cited copending patent application. Thus, an oscillator 10 supplies energy through a transmission line 11 to a sensing element (or transmitter-receiver) 12 which is disposed to interact with a test part 13. First and second coupling means 14 and 15 are associated with transmission line 11 in such manner (for example, one-eighth wave length apart) that they are responsive to substantially different functions of the phases and amplitudes of the microwave signals present in line 11. Stated otherwise, coupling means 14 is responsive to a first function of the amplitudes of the incident and received signals and of the phase difference therebetween. Coupling means 15 is responsive to a second function of the amplitudes of the incident and received signals and of the phase difference therebetween. The above assumes that both coupling means are at least somewhat nondirectional, a different situation being presented (as will be discussed below) when one coupling means is purely directional.

Detectors 16 and 17 are associated, respectively, with coupling means 14 and 15 and are connected to the inputs of a suitable display means 18, for example an XY recorder or an oscilloscope. Accordingly, one function of both phase and amplitude is fed to one input of display means 18 (for example, the input related to the X axis of the display means), whereas the second function of both phase and amplitude is fed to the second display means input (for example, the input related to the Y axis). For purposes of simplicity, the first-mentioned input and the associated lead may be termed the "X input." Correspondingly, the second-mentioned input (and lead) may be termed the "Y input."

The oscillator 10 is a microwave oscillator adapted to generate energy in the microwave range. In contrast to the method and apparatus described in the above-cited patent application, the present method and apparatus do not operate satisfactorily outside the microwave range, which is hereby defined (for purposes of the present specification and claims) as being the range between 300 megacycles and 3000 kilomegacycles. It has been found that submicrowave frequencies are not practical relative to the present invention, particularly in relation to nonmetallic test parts (which are of critical importance).

As indicated in the cited patent application, the transmission line 11 may comprise a wave guide, coaxial cable, strip line or any other form of microwave transmission line. The sensing element 12 may comprise the evanescent-type sensing element described in the cited patent application. The sensing element may also comprise a radiating element such as a microwave horn, dipole, dielectric rod antenna, slot radiator, iris radiator, microwave lens, etc. The sensing element is an antenna or transmitter which transmits the incident signal to the test part 13 and, in the illustrated apparatus, also receives the reflected signal which is then passed back through transmission line 11 to the coupling means 14 and 15 and associated equipment. As will be described relative to FIGS. 2 and 3, separate elements may be employed for transmitting and receiving.

The coupling means 14 and 15, detectors 16 and 17, and display means 18 were described and illustrated in the cited patent application. For example, the coupling means may comprise simple probes, whereas the detectors may comprise diodes. Frequently, the coupling means are located at different points along the transmission line 11, so that each coupler will sample a different function of both amplitude and phase. It is, however, pointed out that the coupling means need not be disposed at two different points, the same result being obtained by the use of two couplers located at the same point (longitudinally of the transmission line) but which are different in design. Among numerous other types of couplers which may be employed are hybrid junctions, holes between adjacent wave guides, cross-guide directional couplers, multihole directional couplers, magic tee's, strip-line couplers, coaxial couplers, etc.

Figures 2, 3:
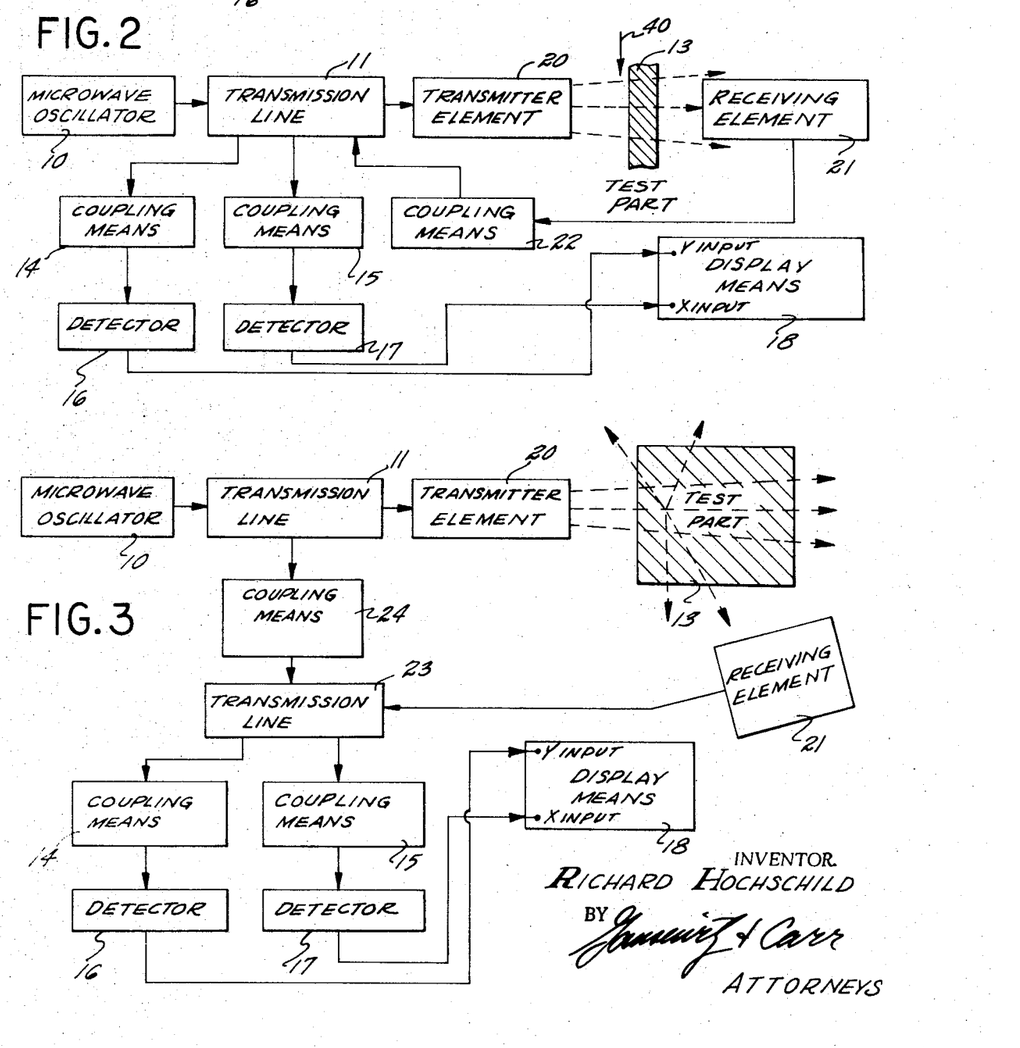
FIGS. 2 and 3 are block diagrams indicating, respectively, second and third embodiments of the invention.

Referring next to the apparatus illustrated schematically in FIG. 2, the circuitry is the same as described relative to FIG. 1, except as will be specifically noted. Instead of employing a sensing element 12 adapted to effect both transmission and reception of the microwave signal, a separate transmitter 20 and receiver 21 are illustrated. Such elements are disposed on opposite sides of the test part 13, so that the receiving element receives energy transmitted through the test part. The physical forms of such transmitting and receiving elements may be the same as those listed in the description of sensing element 12 in FIG. 1.

Receiver 21 is connected to a coupling means 22 which, in turn, is associated with the transmission line 11 as in the case of the coupling means 14 and 15. Thus, the energy received by element 21 is injected into the transmission line. It follows that the first and second coupling means 14 and 15 sense not only the incident energy transmitted from oscillator 10 to the work, but also are responsive to the energy received by element 21.

Referring next to the circuit of FIG. 3, the receiving element 21 is shown as disposed laterally of the workpiece, so that it receives energy scattered thereby (as distinguished from being directly transmitted, or reflected). The energy thus received by element 21 is fed into a second transmission line 23. Line 23 also receives energy from the first transmission line 11, by means of a coupling means 24. In the circuit of FIG. 3, the coupling means 14 and 15 (and associated elements 16—18) are associated with the second transmission line 23, instead of with the first line 11.

It is emphasized that, in all of the circuits shown in FIGS. 1—3, the incident signal and the received signal are passed through the same transmission line (or equivalent element), so that the first and second functions of phase and amplitude may be sensed by means of the elements 14 and 15. In FIG. 1, the reflected signal is received by the sensing element 12 and passed directly into transmission line 11, where it mixes with the incident signal so that the coupling means 14 and 15 are responsive to both incident and reflected waves. In the circuit of FIG. 2, the incident and received signals are again both present in the first transmission line 11, for sensing by elements 14—15, whereas in the circuit of FIG. 3 both incident and received signals are fed into the second transmission line 23 where both are again sensed by the elements 14—15. Because both incident and received waves are present in the same transmission line or equivalent, the amplitudes thereof, and the phase difference therebetween, may be sensed by each of the coupling means 14 and 15.

Various ones of the described relationships between the transmitting element and receiving elements may be employed relative to any of the indicated circuits. Thus, for example, the circuitry of FIG. 2 may be used with transmitting and receiving elements disposed as in FIG. 3, and vice versa. As another example, relative to the circuitry of FIG. 2 or FIG. 3, both of the elements 20 and 21 may be disposed on the same side of the test part 13, so that reflected energy is sensed by receiving element 21. It will thus be understood that the present invention is not dependent upon the particular relationship between the element 12 (or 20—21) and the workpiece, any suitable manner of interaction between the microwave energy and the workpiece being satisfactory.

The transmitting-receiving arrangement shown in FIG. 2, wherein the transmitter and receiver are disposed on opposite sides of the workpiece, is particularly satisfactory in situations where it is desired to determine the average characteristics of the test object 13. On the other hand, applicant has discovered that the transmitting-receiving relationship shown in FIG. 3, wherein the receiving element 21 is responsive to energy scattered by the workpiece, is surprisingly superior to the other arrangements in situations wherein flaws in the workpiece are to be detected.

METHOD OF EFFECTING TWO-CHARACTERISTIC DISPLAYS OF VARIABLES RELATING TO TEST OBJECTS

It is pointed out that (relative to a given testing apparatus) the transmission of microwaves through a test part, and the reflection or scattering of microwaves therefrom, depend upon the following parameters:

1. the dielectric constant of the material;
2. the loss tangent (or dissipation factor) of the material;
3. the dimensions of the material and/or of flaws in the material; and
4. the distance between the test part and the sensing element 12 (or 20 and 21).

Unless stated to the contrary, and for purposes of simplicity of description, it will be assumed that the distance between the test part and the sensing element (or transmitting-receiving elements) remains constant, and that the material is free of substantial flaws. Thus, the interaction between the microwaves and the material depends upon composition (which changes the dielectric constant and loss tangent), and upon dimensions. Let it further be assumed that thickness is the only dimension which may vary, as is normally the case relative to large sheets or strips of plastic, paper, etc.

The assumption is also made that the material is such that composition changes are represented, to an appreciable extent, in only one of the loss-tangent and dielectric-constant variables. For example, in plastic sheets the variation in loss tangent is very frequently negligible, so that changes in composition are represented almost entirely in changes in dielectric constant. It will thus be seen that the remaining variables are thickness and composition (dielectric constant).

Figure 4:
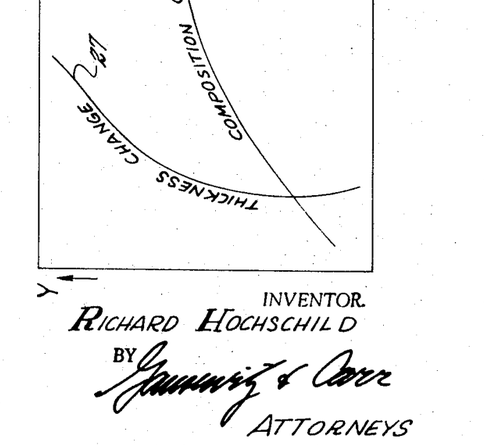
FIG. 4 is a view representing a typical presentation on the chart of an XY recorder, or on the screen of an oscilloscope, and showing the simultaneous determination of several variables.

It is emphasized that the above assumptions are made solely for purposes of convenience of description, for example relative to the illustration of FIG. 4, and are not in any sense limitations upon the scope of the invention which can determine distance, motion, flaws, etc., as well as thickness and composition.

As noted above, the described apparatus is so constructed that the coupling means 14 senses one function of both phase and amplitude relative to the incident and reflective microwaves, whereas the coupling means 15 senses a substantially different function of both phase and amplitude. Because two different functions are sensed, it is possible (by analogy to the laws of simultaneous equations) to solve for two variables (such as thickness and composition). The solutions need not be obtained by calculations, however, it being infinitely more satisfactory and simple to employ empirical methods as will next be indicated.

Referring next to FIG. 4, the rectangle 26 indicates the screen of an oscilloscope, or the graph paper (chart) of an XY recorder. The curves indicated in FIG. 4 are obtained using the embodiments shown in FIGS. 1, 2 or 3, the display means 18 being, for example, an oscilloscope or XY recorder. The abscissa and ordinate of FIG. 4 represent the X and Y axis, respectively, of the display means. The first indicated curve, number 27, is a curve which results when all parameters are maintained constant except the thickness of the test object. The second curve, number 28, results when all parameters are maintained constant except the composition of the test object. The apparatus of FIGS. 1, 2 and 3 is responsive to both composition changes and thickness changes, but the loci of these two changes lie in different directions on the plane of the display means, as illustrated in FIG. 4. Of course, curves 27 and 28 are merely exemplary of many thousands of curves which may be obtained relative to different variables, and different types of test objects.

Figure 5:
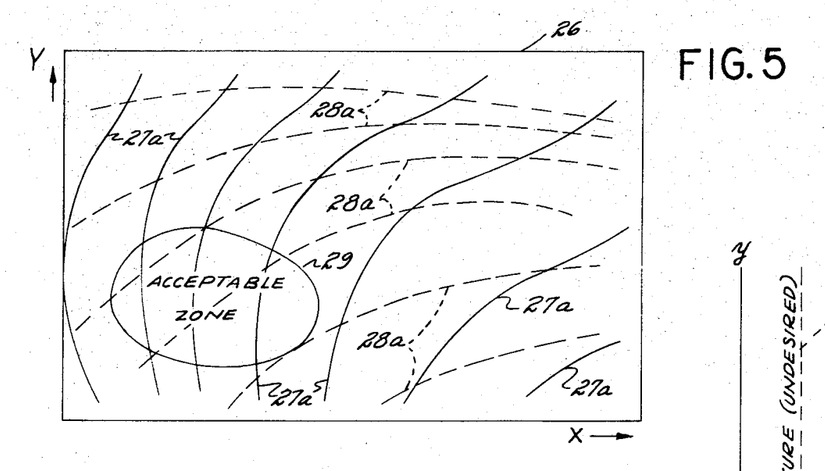
FIG. 5 illustrates a recorder chart or oscilloscope screen calculations; whereon an "acceptable" zone is indicated relative to the several variables which determine the acceptability of test parts.

Curves 27 and 28 may be reproduced for different thicknesses and compositions. This is illustrated in FIG. 5, wherein the dashed-line curves 28a represent composition loci at different fixed thicknesses, and wherein the solid-line curves 27a represent thickness loci at different fixed compositions.

It frequently occurs that test parts are acceptable, from a mass-production standpoint, only when the thickness and composition (or various other parameters) are within predetermined ranges. Such a range may be indicated on the oscilloscope screen or on the chart of an XY recorder, for example as indicated by the closed-line 29 in FIG. 5. Such line may have an extremely irregular shape, in addition to the relatively regular one illustrated. It will thus be understood that an operator may readily separate acceptable parts from unacceptable ones, by merely noting whether or not the dot on the chart of an XY recorder, or the beam of an oscilloscope, strikes the chart or screen within the acceptable zone defined by line 29. Furthermore, particularly relative to oscilloscopes, it will be understood that automatic means (such as photocells) may be employed to effect sorting automatically. Such photocells may be disposed adjacent the portion of the screen defined within line 29.

Let it be assumed, for example, that a particular production run of plastic sheet must have a relative dielectric constant in the range of from 5 to 6, and a thickness in the range of from 0.11 inch to 0.15 inch. To locate the acceptable zone (draw the line 29), it is merely necessary to employ a substantial number of calibrating specimens the thicknesses and dielectric constants of which have been previously determined by other methods and apparatus. More particularly, batches of specimens are employed which:

a. are all 0.11 inch thick but have dielectric constants progressing from 5 to 6,
b. are all 0.15 inch thick but have dielectric constants progressing from 5 to 6,
c. all have dielectric constants of 5, but progress in thickness from 0.11 to 0.15,
d. all have dielectric constants of 6, but progress in thickness from 0.11 to 0.15.

When such batches of calibrating specimens are "tested" by the present method and with the apparatus embodied in FIG. 1, by pressing their flat sides against sensing element 12, a series of points, one point per specimen, is defined on the plane of the display means 18. The zone boundary line is "drawn" on the XY recorder paper 26 or on the oscilloscope screen by joining these points with any suitable marking device.

In situations wherein it is desired to determine variables such as thickness in terms of actual dimensions, the entire oscilloscope screen (or the entire chart of graph of the XY recorder) may be calibrated in the manner described in the previous paragraph, and in the above-cited patent application relative to the dielectric constant-loss tangent chart, FIG. 2.

METHOD AND APPARATUS FOR SUPPRESSING VARIABLES

As previously indicated, there are many mass-production situations wherein it is possible to substantially eliminate all variables except for two, one of such remaining variables being of critical importance and the other relatively unimportant. It is then very desirable to derive a one-characteristic output which relates substantially entirely to the critical variable, being substantially unaffected by the unimportant variable. Such a single voltage output is normally displayed on a meter, a single channel recorder, a digital readout, a digital printer, etc. Furthermore, the output voltage may be employed to actuate a suitable alarm which indicates an out-of-tolerance condition, or to actuate a feedback loop for controlling a production process.

There will next be described a method by which the apparatus embodied in FIGS. 1—3 may be employed to produce a single output voltage at detector 16 which is sensitive to a particular one of two test variables, but is not sensitive to the second or undesired test variable. After the necessary adjustments to be described are made, the output voltage at detector 17 may be disregarded or detector 17 and coupling means 15 may be removed from the apparatus or omitted from duplicate copies of the apparatus. Also after these adjustments have been made, the two-characteristic display means 18 may be replaced by a single-characteristic display means such as a meter. Let it be assumed, for example, that it is desired to measure thickness variations (the "desired" variable) despite the presence of composition variations (the "undesired" variable). Let it further be assumed that the substance being produced is a type of paper, for example, in which the composition variable results substantially entirely from variations in moisture. Thus, the undesired variable is actually moisture.

A first embodiment of the method and apparatus for eliminating or suppressing the undesired variable comprises (as the first step) employing the two-characteristic apparatus and method described relative to FIGS. 1—5 form curves or loci indicating both moisture and thickness. For example, and referring to FIG. 6, the two loci 31 and 32 are obtained by employing the embodiments of FIGS. 1, 2 or 3 in the manner described for generating the curves in FIG. 4. The solid-line curve or locus 31 represents changes in thickness (the moisture content being constant), whereas the solid-line curve or locus 32 represents changes in moisture (the thickness being constant). It is to be noted that the "thickness" locus 31 and the "moisture" locus 32 lie at arbitrary angles with respect to the X and Y axes of the display means, which are represented by the abscissa and ordinate, respectively, in FIG. 6.

In accordance with such first embodiment of the variable-suppression invention, changes (to be described in detail in the fourth following paragraph) are made in the microwave energy sensed by coupling means 14, such changes being adapted to effect: (a) rotation of the loci 31 and 32 until the undesired variable (the moisture locus 32 in the present illustration) is substantially perpendicular to the axis connected to detector means 16, and (b) substantial straightening of the undesired locus 32 over the range of interest. For example, in the illustration of FIG. 6, the dashed-line curve 31a represents the thickness variable after rotation has been effected, whereas the dashed-line curve 32a represents the moisture variable after completion of rotation and straightening. Thus, the curves are rotated through the angles and respectively. In this example, it is assumed that detector means 16 is connected to the X (horizontal) axis of the display means 18.

Figure 6:
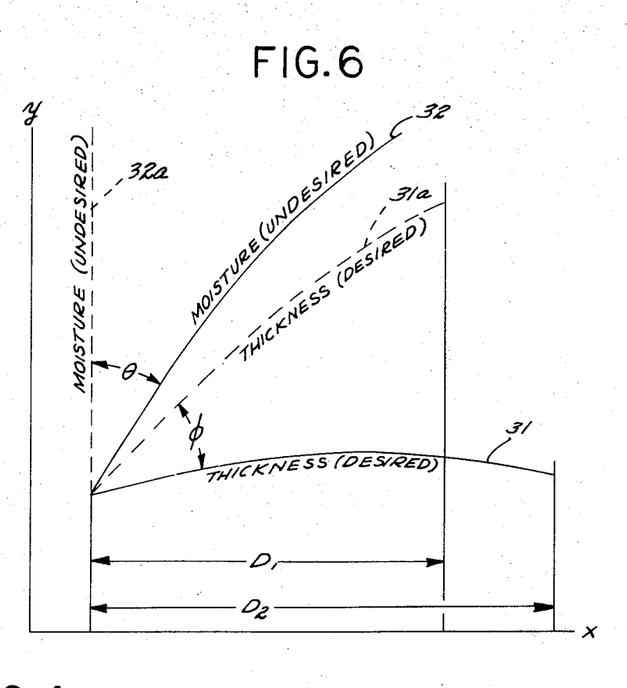
FIG. 6 illustrates graphically the present method and apparatus for suppressing an undesired variable, so that any one of two variables may be uniquely determined without the necessity for any calculations.

Because the rotated locus 32a is substantially perpendicular to the X axis, and because locus 32a represents the undesired moisture variable, a one-characteristic, such as a panel meter, display means is connected to the detector 16 which supplies the X axis (or horizontal) terminal of the oscilloscope or XY recorder. Thus, the meter or other one-dimensional display means is responsive substantially entirely to changes in thickness, as represented by the locus 31a, and is substantially entirely unresponsive to changes in moisture as represented by locus 32a.

The rotation of the desired locus 31a has no bearing upon the accuracy of the response, being instead reflected substantially entirely in the sensitivity of the response. It is pointed out that, although the distance $D_1$, which represents the desired locus 31a projected on the X axis, is substantially shorter than the distance $D_2$ representing the same locus prior to rotation, this relates substantially entirely to sensitivity and can therefore be compensated for, if necessary, by changing factors relative to amplification, etc.

In the great majority of situations, the two loci are at a substantial angle relative to each other, so that the procedures and structures to be outlined hereinafter are only adapted to rotate the undesired locus until it is perpendicular to the axis (input) to which the one-dimensional display means is connected (and, in some cases, to straighten the undesired locus within the range of interest). It sometimes occurs, however, that the desired and undesired loci are generally parallel within the range of interest. In such cases, it is possible in substantially all situations to orient the loci at a substantial angle relative to each other, by following procedures such as the following: (a) change the test frequency within the microwave range, and determine empirically when the desired and undesired loci are at a substantial angle relative to each other; (b) adjust the positions of one or more of the coupling means 14 and 15 along the transmission line; and (c) change the distance between the radiating and/or receiving elements and the test part.

Figure 7:
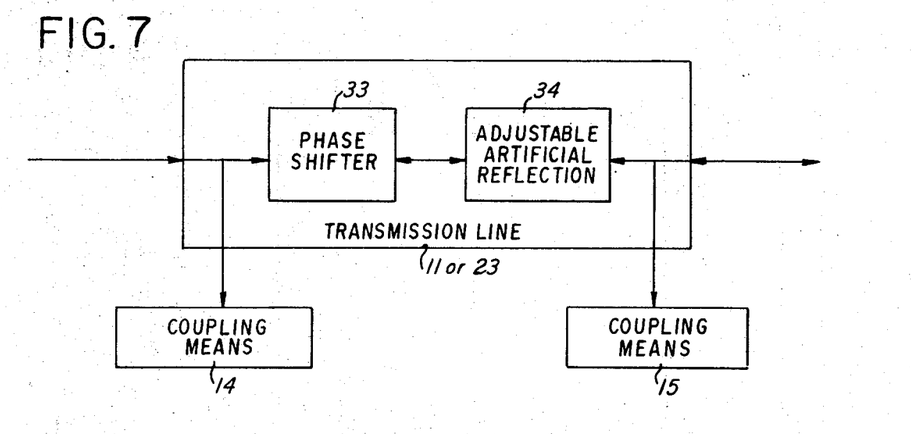
FIG. 7 is a block diagram schematically indicating in more detail one embodiment of transmission line 11 of FIGS. 1, 2 and 3.

Referring to FIG. 7, in order to effect the above-specified changes in the microwave energy sensed by either or both of the coupling means, in other words, to effect: (a) rotation of the loci through the angles Θ and Φ, until the undesired locus is perpendicular to the axis (input) to which the indicator is connected, and (b) substantial straightening of the undesired locus, one or more of the following procedures are followed until the desired result is empirically obtained:

a. changing the electrical length (the number of wave lengths and portions of wave lengths) of the portion of the apparatus which extends between the following points:
  1. the particular coupling means 14 and 15 (FIGS. 1—3) to which the one-characteristic display is connected, and
  2. the end (which is nearest the test object) of the sensing, transmitting or receiving element 12, 20 or 21; using a device such as phase shifter 33 or other device as listed in (a) below;

b. adjusting a source of an artificial reflection (such as 34) which is inserted into (or built into) any of the microwave components shown in FIGS. 1, 2 and 3, as for example, referring to FIG. 7, into transmission line 11 or 23, until the phase and amplitude of the artificial reflection assumes a value adapted to achieve the above-indicated result;

c. changing the design of the coupler or couplers 14, 15 or 22, or using a plurality of couplers and combining their signals.

Referring to the above three types of adjustments, the following are specific ways in which these adjustments may be made:
  a. The electrical length may be changed by:
    1. changing the actual physical distance between the coupler (or couplers) and the end of the sensing (or transmitting or receiving) element;
    2. adjusting a phase-shifting element 33 inserted into the line;
    3. changing the test frequency within the microwave range.
  b. Typical sources of artificial reflections 34 familiar to microwave engineers, are:
    1. slide-screw tuners employing movable probes,
    2. EH or stubtype tuners employing movable short circuits;
    3. posts or screws;
    4. plates or irises;
    5. other types of obstacles designed to create reflections.
  c. Typical types of couplers, also familiar to microwave engineers, are:
    1. directional couplers;
    2. probes;
    3. holes and other apertures;
    4. tee junctions;
    5. hybrid junctions;
    6. multihole couplers;
    7. cross-guide couplers;
    8. strip line couplers Each of the coupling means 14 and 15 may comprise two or more couplers the outputs of which are electronically combined. In certain situations, this simplifies the mathematical relationships by, for example, eliminating terms which are squared functions of the amplitude and the sine or cosine of the phase angle, leaving only linear terms.

The result of any of the above-listed changes or adjustments is a decisive change in the grid pattern (the grid shown in FIG. 5, for example), such change being continued empirically until the above-described results are achieved.

It will be understood that the electrical length is changed by a frequency change, for example, despite the fact that the physical length remains constant. It will also be understood that, relative to all embodiments, changing the location of the operative coupling means changes the electrical length therefrom to both the transmitting end and the receiving end of the apparatus. On the other hand, relative to FIGS. 2 and 3, it is possible (for example, by lengthening element 20) to change the electrical length to the transmitting end without changing the electrical length to the receiving end, or vice versa. Either or both of such changes can produce the desired results.

In summary, therefore, the variables may be suppressed at the output of detector 16 by: (a) changing electrical length, (b) generating an artificial reflection of signal, and (c) varying the design of the coupling means.

In accordance with a second embodiment of the method and apparatus for suppressing undesired variables, the undesired-variable locus which is formed on the XY recorder (or oscilloscope) employing the two-characteristic apparatus and method described relative to FIGS. 1—5 is caused within the range of interest to follow an arcuate path, instead of the above-indicated linear path. The arc has a "predetermined center" which is normally offset from the zero point of the XY recorder chart or oscilloscope screen. The achievement of the arcuate path is accomplished empirically, by varying one or more of the factors listed as (a) to (c) in the above discussion of the first embodiment of the variable-suppression method.

Figure 8:
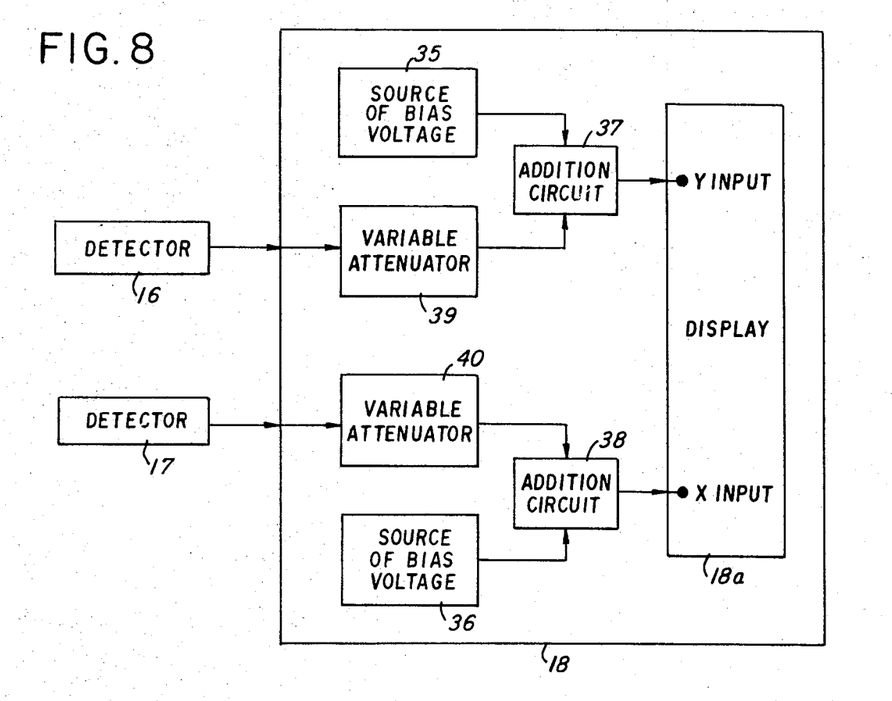
FIG. 8 is a block diagram schematically indicating in greater detail one embodiment of the display means 18 of FIGS. 1, 2 and 3.

The above-indicated "predetermined center" is made coincident with the zero point (corresponding to the deflection of the recorder for zero input voltages to the X and Y channels) of the XY recorder chart. The shift of the "predetermined center" to the zero point may be accomplished by either of two methods:

1. in the "microwave" portion of the circuit, by introducing an artificial reflection (see examples under (b) above) into any of the microwave components shown in FIGS. 1—3, and empirically adjusting the phase and amplitude of the reflection until the predetermined center coincides with the zero point,
2. referring to FIG. 8, in the "detected" portion of the circuit (between the detectors and the display means), by introducing bias voltages from sources 35 and 36 which are added to the output voltages of the detectors by addition circuits 37 and 38 after adjustment of the amplitude of the output voltages by variable attenuators 39 and 40, and shift the grid pattern until the predetermined center coincides with the zero point. Most XY recorders are provided with such attenuator and zero-bias voltage controls for the X and Y channels.

Stated more definitely, the bias voltage supplied to the X input of the XY recorder is caused to be equal and opposite (in polarity) to the X coordinate of the "predetermined center" point. The bias voltage fed to the Y input is, correspondingly, caused to be equal and opposite to the Y coordinate of the "predetermined center" point. Because the "predetermined center" point is thus shifted, each point on the arc is shifted correspondingly, so that the arc is centered on the zero point.

The circuit employed in this second embodiment includes additional circuitry (which may form part of the display means 18, as shown in FIG. 8, or one of the coupling means) to produce a one-characteristic display of the voltage which is a function only of the distance $r$ (radius) between the zero point and the excursion of the XY recorder indicator, and which is not a function of the direction $\alpha$ (angle with respect to the X or Y axis) of the excursion. Restated in terms of polar coordinates $r$ and $\alpha$ about the zero point, the above-mentioned additional circuitry displays a voltage which is sensitive only to $r$, not to $\alpha$. Suitable circuitry, familiar to electronic engineers, consists of amplitude sensing devices which are insensitive to phase. An example would be a directional coupler. This coupler is, for example, inserted in place of coupler 14 and connected to detector 16.

The output of such a one-characteristic display means which is sensitive only to $r$ will be insensitive to the undesired variable. That is, the undesired variable will be substantially suppressed in such a display. This is because the undesired variable, as stated above, follows the arc of a circle about the zero point and therefore produces no change in $r$. On the other hand, a change in any other variable in the test part, such as the desired variable, will follow a locus which deviates from an arcuate path provided (as in the first embodiment) there exists a substantial angle between the loci of the undesired and the other (desired) variable. Any deviation from an arcuate path necessarily produces a change in $r$ and hence in the output of the one-characteristic display means.

It is emphasized that the adjustable elements in either of the above-described embodiments are needed only until the proper adjustments are made to suppress the undesired variable. Once the undesired variable is suppressed in accordance with either of the above-described embodiments, the apparatus shown in FIGS. 1—3 may be substantially simplified, for example to effect mass production of systems adapted to produce the desired one-characteristic display relative to a two-variable (or multivariable) production situation wherein one of the variables is to be suppressed. Thus, relative to each of FIGS. 1—3, the coupling means 15 and detector 17 are eliminated, and the display means 18 may comprise a simple meter instead of an XY recorder, oscilloscope, etc.

It will also be understood that the above two embodiments and any other embodiments of this invention are not restricted to test situations in which there are only two variables, but will be useful regardless of the number of variables present wherever it is desired to suppress one variable.

Applicant has also discovered that the invention relating to the suppression of a variable can be employed at two different frequencies to suppress two different variables instead of just one. Thus, for example, in a test situation where three or more variables are present in the test part, two of these being undesired variables, both undesired variables may be suppressed by employing a source of two (or more) test frequencies (or two sources of different frequencies). Filter circuits familiar to microwave engineers are incorporated in the two detectors shown in FIGS. 1, 2 or 3 to make one detector preferentially sensitive to the second test frequency and the other detector preferentially sensitive to the second test frequency. Adjustments such as those described as (a) to (c) in the discussion of the first embodiment of this invention are then made to suppress one undesired variable in the first detector output and another (second) undesired variable in the second detector output.

If the above three variables are designated as A, B and C, A being the desired variable, then the output of the first detector is a function of A and B only while the output of the second detector is a function of A and C only. If these two outputs are applied to a computer programmed in accordance with the above two functional relationships, it is possible to solve for A uniquely. This calculation can be performed either automatically or manually.

The apparatus and method described in this invention are normally employed, in commercial production, relative to a large moving part (such as a strip of plastic, for example), or relative to a large number of corresponding parts (which may be sequentially positioned in a jig, for example). In the appended claims, the expression "test part" comprehends not only a single large part or object, but also a multiplicity of parts or objects. The movement of a large part is indicated by the arrow 40 in FIG. 2.

The expression "a characteristic relative to a test object" denotes any of the above-indicated parameters, e.g., thickness, movement, distance from a predetermined reference point, dielectric constant, etc.

Such phrases as "display means," etc., as employed in the appended claims, refer to the element 18 of FIGS. 1—3. As previously indicated, this includes not only various forms of visual display means, but also feedback loops, various control and alarm devices, etc. The phase "display means of the XY type" is generic to oscilloscopes, XY recorders, and equivalent two-dimensional displays. The phrase "output means" refers to such apparatus as one or both of couplers 14 and 15, with associated detectors 16 and 17.

As indicated above and in the cited patent application, one of the two coupling means 14 and 15 may be directional instead of nondirectional. The directional coupler is constructed to respond to the signal received from the test part. Although, in such a special situation, the "first and second functions of phase and amplitude" may not be sensed (in that the directional coupler does not respond to the incident signal), such situation is nevertheless to be regarded as comprehended within the accompanying claims.

The foregoing detailed description is to be clearly understood as given by way of illustration and example only, the spirit and scope of this invention being limited solely by the appended claims.

I claim:

1. A method of determining, in a nondestructive manner, a characteristic relative to a test object, which method comprises:
  generating a signal in the microwave range employing a microwave generator means,
  supplying said microwave signal through a transmission-line means to a transmitting means, transmitting said microwave signal from said transmitting means to a test object, whereby said microwave signal interacts with said test object;
  receiving said microwave signal after interaction thereof with said test object employing a receiving means;
  supplying the received microwave signal from said receiving means to an output means adapted to generate at least one output voltage representing a function of the amplitude and phase of said received signal; and adjusting at least one of said means until said output voltage does not vary in substantial amount in accordance with one of a plurality of characteristics relative to said test object.

2. The invention as claimed in claim 1, in which said adjusting step comprises adjusting the electrical length of the portion of said transmission-line means which lies between said output means and the end of the transmitting or receiving means which is adjacent to the test object.

3. The invention as claimed in claim 1, in which the microwave signal from said receiving means is supplied to an output means adapted to generate at least two output voltages representing different functions of the amplitude and phase of said received signal, and in which said adjusting step comprises mathematically adjusting and combining said output voltages to produce a third output voltage which does not vary in substantial amount in accordance with one of a plurality of characteristics relative to said test object.

4. A method of determining, in a nondestructive manner, one characteristic relative to a test object, which comprises:

generating a signal in the microwave range employing a microwave generator means, supplying said signal to a transmitting means;

transmitting said signal from said transmitting means to a test object whereby said signal interacts with said test object;

receiving said signal after said interaction thereof with said test object;

mixing the received signal with said signal supplied to said transmitting means employing mixer means, sensing a function of phase and amplitude of said received signal and said signal supplied to said transmitting means at a region where said signals are mixed employing sensing means;

generating an output voltage responsive to said function; and empirically adjusting at least one of said means until said output voltage is not substantially responsive to one of a plurality of variables which are present relative to said test object.

5. Apparatus for effecting, in a nondestructive manner, simultaneous determination of a plurality of variables relative to a test object, which comprises:

a microwave generator;

means to transmit a microwave signal from said microwave generator to a test object whereby said signal interacts therewith;

receiving means to receive said microwave signal;

transmission line means electrically coupled to said generator and said receiving means wherein at least part of said received signal will be simultaneously present with at least part of the transmitted signal;

means to sense first and second functions of the phase and amplitude of the signals present in said transmission-line means;

means to change the signal amplitude of each of said first and second functions;

means to mathematically combine said first and second functions after said change to produce a third function which is not substantially responsive to one variable relative to said test object after said change of signal amplitude; and means to display said third function.

6. A method of nondestructive testing, comprising:

generating a signal in the microwave range;

transmitting said microwave signal to a test object for interaction therewith;

receiving said microwave signal after said interaction with said test object;

sensing first and second different functions of the amplitude of said received signal and of the phase thereof relative to the phase of the transmitted signal;

generating output voltages responsive, respectively, to said first and second functions;

supplying said output voltages to the X and Y inputs of an XY display means;

maintaining constant, relative to said test object, all parameters except the desired variable to thereby provide on said display means a visual indication of the locus of such desired variable;

maintaining constant, relative to said test object, all parameters except an undesired variable to thereby provide on said display means a visual indication of the locus of such undesired variable;

empirically adjusting at least one electrical characteristic of at least one of the signal generating, transmitting, receiving and sensing means until the locus of the undesired variable is substantially parallel to the axis associated with one of the inputs of said display means; and supplying to a one-characteristic display means the output voltage leading to the remaining one of said inputs of said display means.

7. The invention as claimed in claim 6, in which said method additionally includes the step of empirically adjusting at least one electrical characteristic of at least one of the signal generating, transmitting, receiving and sensing means until said loci of the desired and undesired variables are at a substantial angle relative to each other, and until the locus of the undesired variable is relatively straight.

8. The invention as claimed in claim 6, in which said method additionally includes the step of empirically adjusting at least one electrical characteristic of at least one of the signal generating, transmitting, receiving and sensing means until said locus of the undesired variable is substantially the arc of a circle.

9. Apparatus for effecting testing and sensing by means of microwaves, which comprises:

a microwave oscillator;

transmission-line means connected to said oscillator;

transmitting-receiving means connected to said transmission-line means;

said transmitting-receiving means being adapted to transmit microwave energy to a test part and receive such energy therefrom after interaction with said test part;

a coupling element connected to said transmission-line means and adapted to sense a function of the phase and amplitude of the microwave signals present in said transmission-line means;

the electrical length of said transmission-line means between said coupling element and the end of said transmitting-receiving means which is adjacent said test part being such that said function sensed by said coupling element is substantially unresponsive to one of a plurality of variables present relative to said test part; and means electrically connected to said coupling element to effect a display of said function.

10. Apparatus for effecting testing and sensing by means of microwaves, which comprises:

a microwave oscillator;

a transmission line connected to said oscillator;

a transmitting element connected to said transmission line for reception therefrom of a microwave signal generated by said oscillator;

said transmitting element being adapted to transmit microwave energy to a test part;

receiving means to receive said energy from said test part after interaction therewith;

first and second coupling means electrically connected to said transmission line in such manner that said coupling means sense first and second separate functions of the phase and amplitudes of microwave signals present in said transmission line;

a third coupling means connected between said receiving means and said transmission line to introduce received microwave energy into said transmission line;

first and second detectors electrically connected, respectively, to said first and second coupling means to convert the energy sensed thereby into first and second output voltages; and a two-characteristic display means connected to said detectors whereby to effect simultaneous display of said output voltages.

11. Apparatus for effecting testing and sensing by means of microwaves, which comprises:

a microwave oscillator;

a first transmission line connected to said oscillator;

a transmitting element connected to said first transmission line for reception therefrom of a microwave signal generated by said oscillator;

said transmitting element being adapted to transmit microwave energy to a test part;

a receiving element to receive said energy from said test part after interaction therewith;

a second transmission line;

means to introduce microwave energy from said receiving element into said second transmission line;

a first coupling means to transfer microwave energy from said first transmission line into said second transmission line;

second and third coupling means electrically connected to said second transmission line in such manner that said second and third coupling means sense first and second separate functions of the phase and amplitude of the microwave signals present in said second transmission line;

first and second detectors electrically connected, respectively, to said second and third coupling means to convert the energy sensed thereby into first and second output voltages; and a two-characteristic display means connected to said detectors whereby to effect simultaneous display of said output voltages.

12. A method of testing and sinsing by means of microwaves, which comprises:

generating a microwave signal;

passing at least part of said signal through a transmission line;

transmitting at least part of said signal to a test part;

receiving at least part of said signal from said test part and mixing at least part of the received signal with said signal in said transmission line;

associating a coupling means with said transmission line to sense a function of the phases and amplitudes of the signals present therein;

empirically adjusting at least one of the following three parameters until one variable relative to said test part is substantially suppressed:

a. the electrical length between said coupling means and the transmitting-receiving end of the apparatus through which said signal passes;

b. the signal reflection present in said transmission line; and c. the design of said coupling means, and supplying said function to a display means.

13. A method of suppressing two variables, which comprises:

generating first and second signals having different test frequencies in the microwave range;

transmitting said signals to an object under test and receiving said signals after interaction with said object under test, employing a receiving means, electrically connecting to said receiving means a first coupler which is substantially insensitive to said second signal;

electrically connecting to said receiving means a second coupler which is substantially insensitive to said first signal, adjusting at least one of said apparatus and couplers until the function sensed by said first coupler is substantially unresponsive to a first variable relative to said test object, adjusting at least one of said apparatus and couplers until the function sensed by said second coupler is substantially unresponsive to a second variable relative to said test object; and determining at least one variable relative to said test object employing the output of said couplers.

14. A testing and sensing apparatus, comprising:

microwave-generator means to generate a microwave signal, means to transmit said microwave signal to a test object and to receive said signal after interaction thereof with said test object;

mixer means to mix the received signal with said signal supplied to said transmitting means;

sensing means to generate an output voltage which is a function of the amplitude of said received signal and of the phase difference between said received signal and said signal supplied to said transmitting means at a region where said signals are mixed;

means for shifting said phase difference until said output voltage ceases to be responsive to one variable in said test object while continuing to be responsive to other variables in said test object, and means to effect a display of said voltage.